United States Patent
Tsukahara et al.

[11] Patent Number: 5,905,479
[45] Date of Patent: May 18, 1999

[54] COLORING DEVICE WITH ROTARY FILTER AND DETECTION SENSOR MOUNTED ON THE DRIVE MOTOR ROTOR

[75] Inventors: Toshiro Tsukahara; Tomoaki Ide; Katsumi Kurita; Shigeki Kariya, all of Nafaokakyo, Japan

[73] Assignee: Mitsubishi Denki Kabushiki Kaisha, Tokyo, Japan

[21] Appl. No.: 08/782,675

[22] Filed: Jan. 15, 1997

Related U.S. Application Data

[62] Division of application No. 08/045,672, Apr. 8, 1993.

[30] Foreign Application Priority Data

| Apr. 10, 1992 | [JP] | Japan | 4-90945 |
| Jul. 17, 1992 | [JP] | Japan | 4-190863 |
| Oct. 13, 1992 | [JP] | Japan | 4-274335 |
| Oct. 28, 1992 | [JP] | Japan | 4-289779 |

[51] Int. Cl.$^6$ ............. G09G 1/28; H04N 9/10; H04N 9/083; H04N 9/12
[52] U.S. Cl. ............. 345/22; 348/196; 348/270; 348/271; 348/743
[58] Field of Search .............. 348/743, 742, 348/368, 367, 268, 269, 270, 271, 196; 345/22, 32, 110; 359/234, 235, 236

[56] References Cited

U.S. PATENT DOCUMENTS

| 2,769,027 | 1/1956 | Adams | 348/743 |
| 3,821,793 | 6/1974 | Carson | 348/743 |
| 4,197,559 | 4/1980 | Gramling | 348/743 |
| 4,429,263 | 1/1984 | Muller | 318/254 |
| 4,547,714 | 10/1985 | Muller | 318/254 |
| 4,685,000 | 8/1987 | Barrett | 358/332 |
| 4,831,437 | 5/1989 | Nishioka et al. | 358/98 |
| 5,010,415 | 4/1991 | Suzaki | 358/302 |
| 5,034,642 | 7/1991 | Hoemann et al. | 310/156 |
| 5,046,162 | 9/1991 | Ishikawa et al. | 348/270 |
| 5,371,543 | 12/1994 | Anderson | 348/743 |

FOREIGN PATENT DOCUMENTS

| 0161032 | 11/1985 | European Pat. Off. |
| 2835210 | 2/1980 | Germany . |
| 62-102690 | 5/1987 | Japan . |
| 63-109645 | 5/1988 | Japan . |
| 61220558 | 9/1996 | Japan . |

*Primary Examiner*—Jeffery Brier
*Assistant Examiner*—David L Lewis

[57] ABSTRACT

A coloring device for use, for example, in a color image display device, includes a rotary filter rotated by a motor and includes color filter sections of the three colors which pass over the screen of a monochromatic display device in a predetermined sequence as the rotary filter rotates. The coloring device may include two or more sets of color filter sections to enable reduction of the speed of rotation. For size reduction, a member to be detected, used for detection of the rotation of the rotary filter, may be provided on the rotor of the drive motor, or the filter assembly having the rotary filter may be directly mounted to the rotor of the motor. The rotary filter may be in the form of a disk or a cone. In the latter case, it is advantageous that the color filter sections are formed of a transparent base provided with filter sheets attached thereto or coatings having a transparency only to light of the respective color.

11 Claims, 17 Drawing Sheets

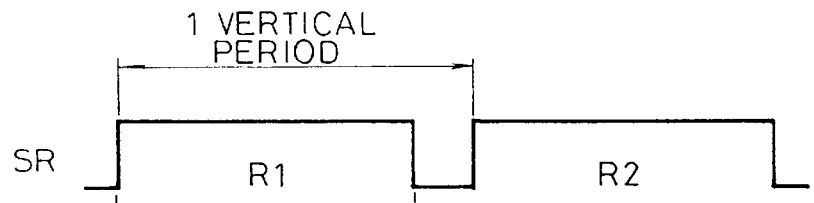
FIG. 3A PRIOR ART
FIG. 3B PRIOR ART
FIG. 3C PRIOR ART
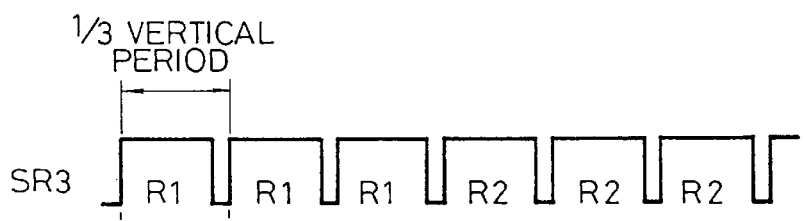
FIG. 4A PRIOR ART
FIG. 4B PRIOR ART
FIG. 4C PRIOR ART FIG. 18A
FIG. 19
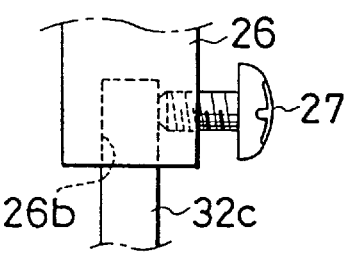
FIG. 18B
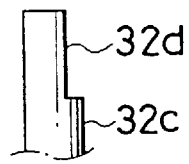
FIG. 20A         FIG. 20B
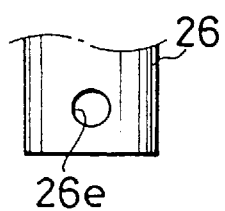    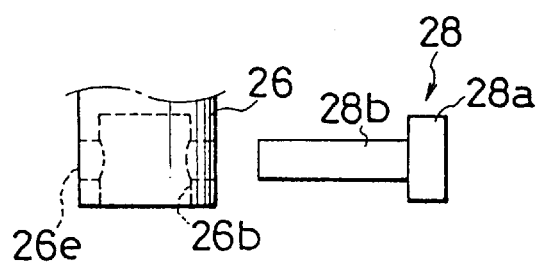

COLORING DEVICE WITH ROTARY FILTER AND DETECTION SENSOR MOUNTED ON THE DRIVE MOTOR ROTOR

This application is a divisional of Ser. No. 08/045,672, filed Apr. 8, 1993.

BACKGROUND OF THE INVENTION

The present invention relates to a coloring device used in combination with a monochromatic display device to form a color image display device or in combination with a monochromatic image pick-up device to form a color image pick-up device.

FIG. 1 shows a conventional color image display device using a monochromatic image display, such as a black-and-white CRT (cathode-ray tube).

As illustrated, it includes a black-and-white CRT 10 and a coloring device 20 including a filter assembly 22 and a D.C. (direct current) rotary motor 30. The filter assembly 22 has a disk-shaped rotary filter 24 formed of color filter sections FR, FG and FB permitting transmission of light of red (R), green (G) and blue (B) and each extending over an angular range of 120, as illustrated in FIG. 2. In other words, the disk-shaped rotary filter 24 is divided by radially extending lines 24rg, 24gb and 24br into three equal sectors FR, FG and FB, each having a vertex angle of 120° and respectively serving as color filters for red (R), green (G) and blue (B). The rotary filter 24 is fixed by a connection member 26 to a motor shaft 32 of the motor 30, and is rotated by the motor 30.

As the motor 30 rotates, the filter sections FR, FG and FB sequentially pass over a screen 12 of the CRT 10.

A rotation sensor 40, which may comprise a Hall element, detects the rotation phase of the rotary filter 24. A magnet 50 is attached to the shaft 32 of the motor 30 and serves as a detection member (member to be detected by a sensor) by the rotation sensor 40. That is, each time the shaft 32 rotates, the magnet 50 passes by the sensor 40, which thereby detects the passage of the magnet 50, on the basis of the magnetic field emanating from the magnet 50, and generates a rotation sync pulse P.

The rotation sync pulse P is supplied to a control device 60. The control device 60 also receives a vertical sync signal VD directly and also via a frequency converter 62. The frequency converter 62 converts the vertical sync signal VD into a triple-frequency vertical signal V3 having a frequency three times that of the vertical sync signal VD.

The control device 60 supplies the motor 30 with a drive signal. The rotation of the motor 30 is controlled such that the rotary fitter 24 rotates once per vertical. period, and the rotation sync pulse P is produced at a constant phase angle relative to the vertical sync signal VD.

Another frequency converter 68 converts a horizontal sync signal HD into a triple-frequency horizontal signal H3 having a frequency three times that of the horizontal sync signal HD.

Image signal memories 66R, 66G and 66B receive and store color image signals SR, SG and SB of red, green and blue together forming a color image.

The memories 66R, 66G and 66B are supplied with a horizontal sync signal HD and the vertical sync signal VD as reference sync signals for writing, and are supplied with the triple-frequency horizontal signal H3 and the triple-frequency vertical signal V3, as reference sync signals for reading.

The color image signals SR, SG and SB are sequentially written in the memories 66R, 66G and 66B. The color image signals for one field are stored at a time, and the color image signals SR, SG and SB for one field are repeatedly read three times, each in a period of one third of the vertical period. The writing and reading are carried out concurrently. Thus, color image signals SR3, SG3 and SB3 of a triple rate, and repeated three times, each for a period of one third of the vertical period, are obtained from the memories 66R, 66G and 66B.

FIGS. 3A to 3C show the color image signals SR, SG and SB supplied to the memories 66R, 66G and 66B, and FIGS. 4A to 4C show the color image signals SR3, SG3 and SB3 output from the memories 66R, 66G, and 66B. The waveforms are shown schematically to facilitate distinction between the three color image signals. The reference marks R1, R2, G1, G2, B1 and B2 show that in reading the same color image signals are repeatedly read three times, at a triple rate. For instance, the color image signal R1 of red for one field is written over one vertical period, and is read three times, each in one third of a vertical period.

The triple-rate color image signals SR3, SG3 and SB3 output from the memories 66R, 66G and 66B are supplied to the multiplexer 64, which is controlled by a switching signal S supplied in synchronism with the signal V3. As a result, one of the color image signals SR3, SB3 and SB3 corresponding to the filter section FR, FG or FB which is passing over the screen 12 of the CRT 10 is supplied from the multiplexer 64 to the CRT 10.

The triple-frequency signal H3 is supplied from the frequency converter 68 to a horizontal deflection circuit 70, and the triple-frequency signal V3 is supplied from the frequency converter 62 to the vertical deflection circuit 72. Horizontal and vertical deflection signals are supplied from the deflection circuits 70 and 72 to horizontal and vertical deflection coils (not shown) in the CRT 10. The CRT 10 therefore conducts horizontal and vertical deflection scanning at a rate three times that of ordinary scanning.

FIGS. 5A to 5D show the relationship between the rotation phase of the rotary filter 24, the scan line SL of the CRT 10 and the switching of the multiplexer 64.

The multiplexer 64 is controlled to operate in synchronism with the triple-frequency vertical signal V3 as described above, and is made to select the color image signals corresponding to the filter section that is passing over the screen 12 of the CRT 10, in accordance with the rotation sync pulse P. The multiplexing is so made that when the boundary 24br between the filter sections FB and FR is passing over the center (the midpoint in the vertical direction) of the screen 12 of the CRT 10, supply of the blue color image signal SB3 for one field to the CRT 10 is terminated and supply of the red color image signal SR3 for one field is commenced (FIG. 5A). Similarly, when the boundary 24rg between the filter sections FR and FG is passing over the center of the screen 12 of the CRT 10, one third of the vertical period later, supply of the red color image signal SR3 for one field to the CRT 10 is terminated and supply of the green color image signal SG3 for one field is commenced (FIG. 5D). Similarly, when the boundary 24gb between the filter section FG and FB is passing over the center of the screen 12 of the CRT 10, one third of the vertical period later, supply of the green color image signal SG3 for one field to the CRT 10 is terminated and supply of the blue color image signal SB3 for one field is commenced (not illustrated)

With the above configuration, the triple-frequency signals SR3, SG3 and SB3 are sequentially supplied from the multiplexer 64 to the CRT 10, while the horizontal and the vertical deflection scans are conducted at a triple rate, so black-and-white images due to the color image signals SR3, SG3 and SB3 are sequentially displayed on the screen 12, each in a period one third that of the vertical period.

As described above, the selection between the color image signals SR3, SG3 and SB3 is made in conformity with the filter sections FR, FG and FB of the rotary filter 24 which is passing over the screen 12 of the CRT 10, so that as the image due to the color image signal SR3, SG3 or SB3 is displayed on the screen 12, the corresponding filter section FR, FG or FB is positioned over the screen 12 of the CRT 10.

Accordingly, red, green and blue images by virtue of the color image signals SR3, SG3 and SB3 are obtained through the filter sections FR, FG and FB of the rotary filter 24, at the one-third vertical period. The net effect is that a color image is seen to the viewer observing the image through the filter sections FR, FG and FB.

Because the color image display device in the prior art is configured as described above, the space between the stator 33 and the rotor 35 combination of the motor 30 and the filter sections FR, FG and FB of the rotary filter 24 must be wide to permit disposition of the rotation sensor 40 between the stator 33/rotor 35 combination and the rotary filter 24, and this imposes a limitation on size reduction.

Another problem is that the speed at which the rotary filter 24 must be rotated is high. That is, the drive motor 30 is required to rotate the rotary filter 24 at the frequency of the vertical sync signal. The voltage applied to the motor must therefore be high, and the power consumption is large.

In another example of the prior art shown in FIGS. 6 and 7, the rotary filter 124 is in the form of a truncated circular cone and is radially divided, into equal parts, which form filter sections of red, green and blue. The conical rotary filter 124 has its small-diameter end 124a mounted to the output shaft 132 of a motor 130, and is provided so that it can rotate about its axis 124x of the cone in the direction of the arrow 124r. As shown in FIG. 6, the screen 12 of the CRT 10 is provided to confront the outer conical surface of the rotary filter 124. By utilizing the space efficiently in this way, the size of the overall device can be reduced.

The arrangement of FIGS. 6 and 7 suffers from the same problem as the arrangement of FIG. 1 if a magnet for detection of the rotation phase is attached to the shaft 132.

Another problem is that the conical rotary filter 124 with three sections having different filter characteristics is difficult to fabricate.

It is also possible to form a color image pick-up device by using the coloring device 20 and a monochromatic image sensor, such as a line sensor, but such an image pick-up device has similar problems.

SUMMARY OF THE INVENTION

An object of the invention is to enable reduction of the size of the device.

Another object of the invention is to enable reduction of the speed of rotation of the rotary filter.

Another object of the invention is to facilitate manufacture of the rotary filter.

A coloring device according to one aspect of the invention comprises:
  a rotary filter having color filter sections of at least three colors; and
  a rotary driving means for rotating the rotary filter in such a manner that the color filter sections of respective colors pass a predetermined position as the rotary filter is rotated;

wherein
said driving means comprises:
  a rotary motor having a stator and a rotor for rotating the rotary filter,
  a detection member which rotates together with the rotary filter;
  a rotation sensor for detecting said detection member, thereby to detect the rotation phase of the rotary filter; and
  a motor control means for controlling the rotation of the rotary motor on the basis of the rotation phase detected by said rotation sensor;
  wherein said detection member is disposed on the rotor of said rotary motor.

With the above arrangement, the detection member for detection of the rotation phase of the rotary filter is disposed on the rotor of the motor, so no space is required for disposing the rotation sensor between the main body of the motor and the rotary filter, and the size reduction is therefore possible.

The coloring device may be further provided with
  a connection member for connecting the rotary filter to the motor:
wherein
  said motor has an output shaft;
  said connection member is fixed to the rotary filter; and
  said shaft of said rotary motor and the connection member are connected so that said detection member is positioned at a specific rotary position relative to the color filter sections.

With such an arrangement, the coloring device is easy to manufacture and is less costly, and yet the rotation phase of the rotary filter can be accurately detected by the use of the rotation sensor.

A coloring device according to another aspect of the invention comprises:
  a monochromatic image display means having a screen for display of images;
  a rotary filter comprising color filter sections of at least three colors;
  a rotary driving means for rotating the rotary filter in such a manner that the color filter sections of respective colors pass over the screen as the rotary filter is rotated; and
  a signal supplying means for supplying the monochromatic display means with color image signals of the color images of the respective colors in a predefined sequence:
    wherein said rotary filter has a plurality of sets of said color filter sections which are provided in such a manner that the color filter sections of the respective colors pass said predetermined position in a predefined sequence, repeatedly a plurality of times per rotation of the rotary filter.

With the above arrangement, the rotary filter includes of a plurality of sets (N sets) of filter sections of respective colors, so that the rotational speed of the rotary filter may be lowered. For instance, where the coloring device is used in combination with a monochromatic display device, the rotary filter need only be rotated at a speed V/N (V being the frequency of the vertical sync signal) revolutions per second, in conformity with the switching of the color image signals. As a result, the voltage applied to the motor may be lowered. This is an advantage because the power consumption can be lowered, and greater margin in voltage is attained with a lower rotational speed under a condition of a given load.

A coloring device according to another aspect of the invention comprises:

a filter assembly having color filter sections of at least three colors; and driving means for rotating the filter assembly in such a manner that the color filter sections of respective colors pass a predetermined position as the filter assembly is rotated;

wherein said driving means comprises a rotary motor having a stator and a rotor for rotating the filter assembly; and said filter assembly is directly mounted to the rotor of said motor.

With the above arrangement, the distance between the rotary filter and the motor main body is minimized, so that the size of the overall device is reduced. Moreover, the rotary filter can be fixed to the rotor at positions radially farther away from the axis of rotation than if the connection is made at the shaft, so that accuracy in mounting is improved, and the miss-alignment (offset) between the motor main body reduce rotary filter is reduced.

A coloring device of another aspect of the invention comprises:

color filter sections of at least three colors;

wherein said rotary filter is in the form of a cone divided by its generators, into parts which form respective ones of said color filter sections; and each of said color filter sections is formed of a transparent base which is either provided with a filter sheet attached thereto or provide with a coating having a transparency only to the light of the respective color.

With the above arrangement, the rotary filter is easy to fabricate and is less costly, and accuracy in the positions of the boundaries between filter sections of different colors can be improved.

BRIEF DESCRIPTION OF THE DRAWINGS

FIG. 3A to FIG. 3C illustrate the color image signals written into the image signal memories.

FIG. 4A to FIG. 4C illustrate the color image signals read out of the image signal memories.

FIG. 9B is fixed to the motor of FIG. 10A and FIG. 10B.

FIG. 18A is a top view of an end part of a motor shaft used in combination with the connection member of FIG. 17A and FIG. 17B.

FIG. 18B is a side view of the end part of the motor shaft of FIG. 18A.

FIG. 19 is a side view showing how the connection member of FIG. 17A and FIG. 17B is fixed to the end part of the motor shaft of FIG. 18A and FIG. 18B.

FIG. 20A is a side view of a connection member of a filter assembly used in another embodiment of the present invention.

FIG. 20B is a side view, as seen from a different angle, of the connection member of FIG. 20A, with a pin to be inserted thereinto.

FIG. 23B is fixed to the end part of the motor shaft of FIG. 24A and FIG. 24B.

FIG. 26B is fixed to the end part of the motor shaft of FIG. 27A and FIG. 27B.

DETAILED DESCRIPTION OF THE EMBODIMENTS

Embodiment 1

Figure 1:
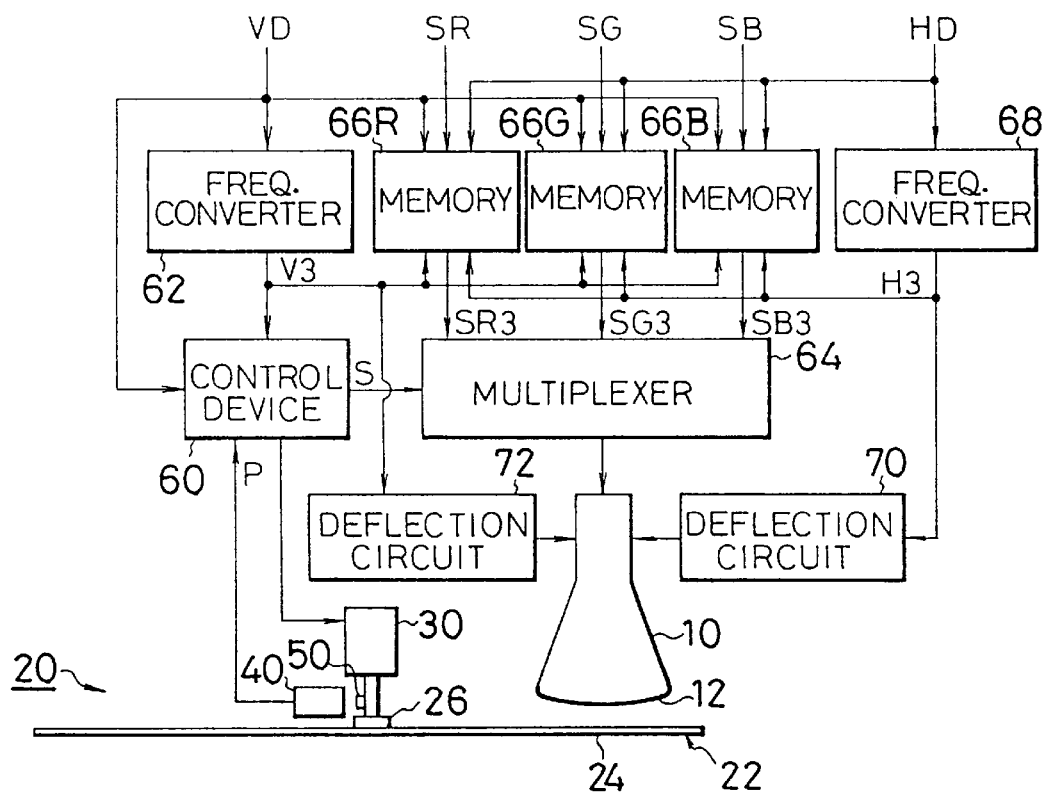
FIG. 1 illustrates a conventional color image display device.
Figure 2:
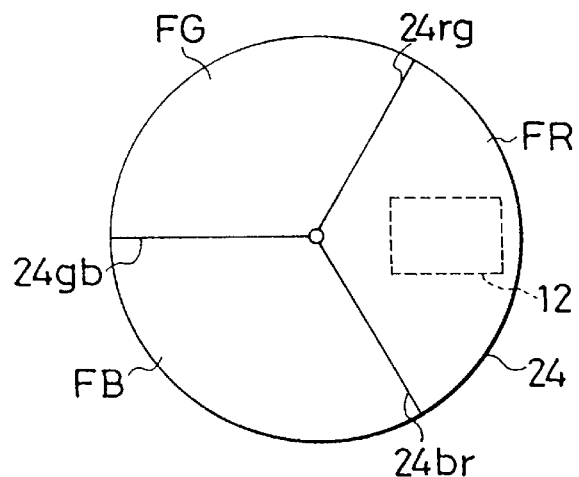
FIG. 2 illustrate the configuration of the rotary filter.
Figure 5A:
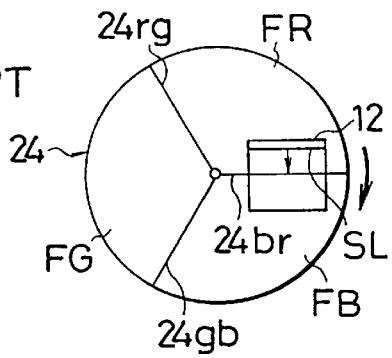
FIG. 5A to FIG. 5D illustrate the relationship between the rotation phase of the rotary filter, the scan line of the CRT and the switching of the multiplexer.
Figure 5A:
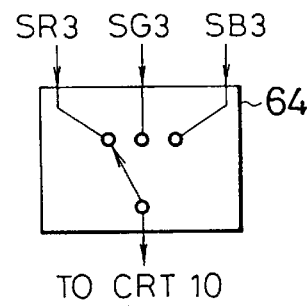
Figure 5B:
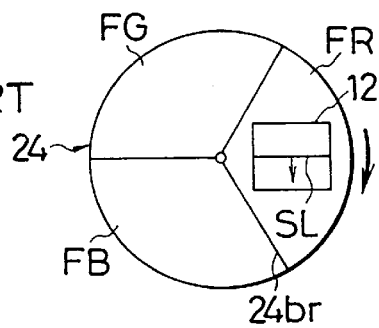
Figure 5B:
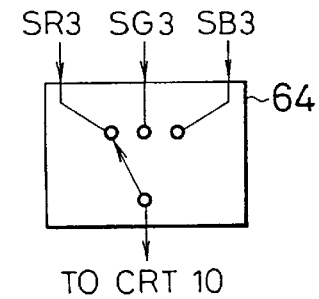
Figure 5C:
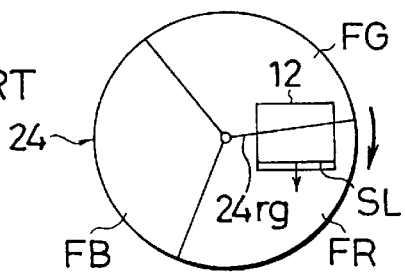
Figure 5C:
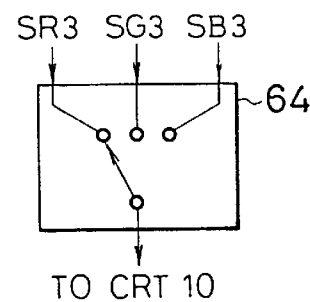
Figure 5D:
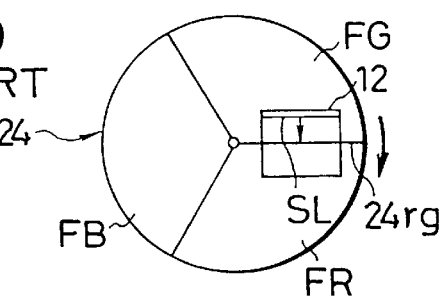
Figure 5D:
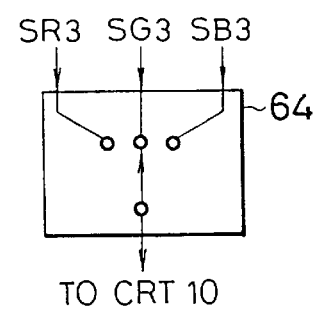
Figure 8:
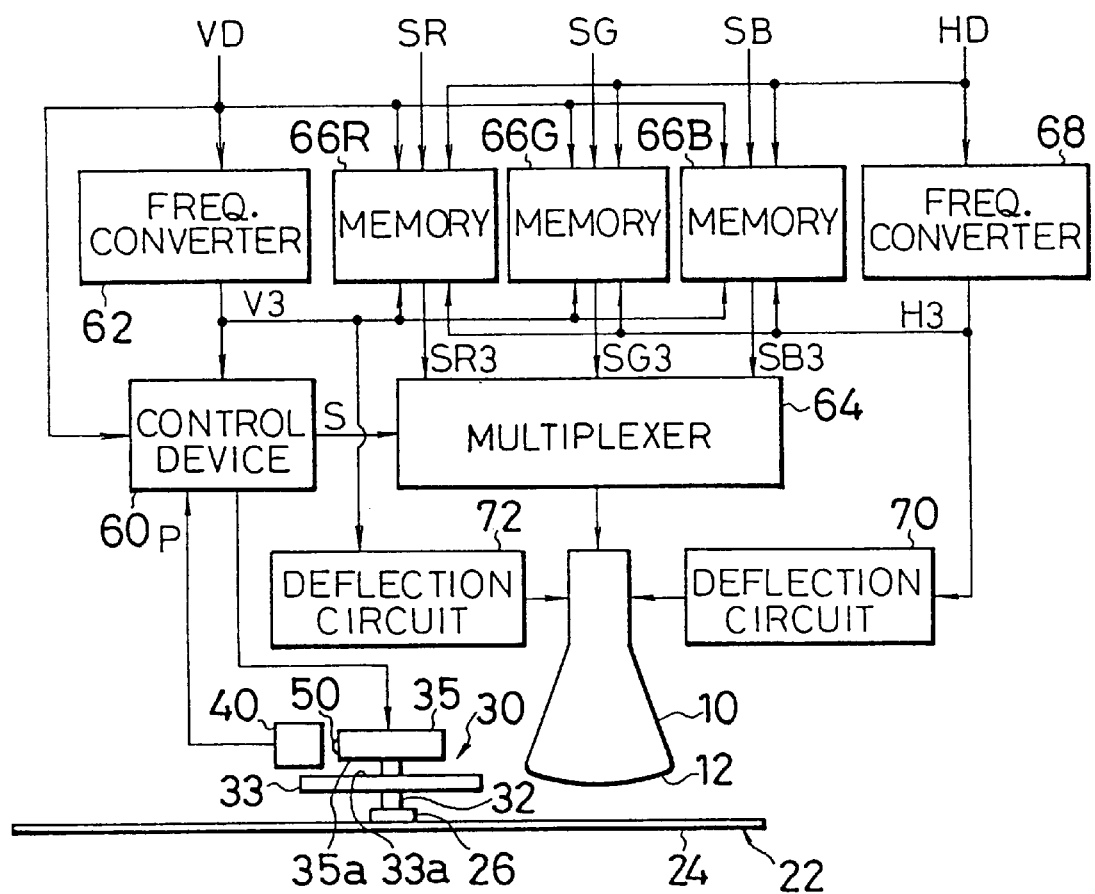
FIG. 8 illustrates one embodiment of the present invention.

FIG. 8 shows the configuration of an embodiment of the color image display device according to the present invention. The components or parts identical or corresponding to those in FIG. 1 are given identical reference numerals, and description of the identical components and parts is omitted.

In this embodiment, the rotary motor 30 has a disk-shaped stationary part or stator 33 mounted to a frame of the color image display device, riot shown as such, rotatably supporting a shaft 32 extending therethrough, a disk-shaped rotary part or rotor 35 fixed to the shaft 32 and having a first surface 35a adjacent to and confronting a first surface 33a of the stator 33. The rotor 35 is mounted toward one end (upper end as seen in FIG. 8) of the shaft 32, while a filter assembly 22 including a rotary filter 24 and a connection member 26 is mounted toward a second end (lower end as seen in FIG. 8) of the shaft 32, opposite to the rotor 35 with respect to the stator 33.

The motor shaft 32 of the rotary motor 30 and the filter assembly 22 are formed integrally. That is, the motor shaft 32 and the base material of the filter assembly 22 are welded together or bonded together by an adhesive where they are both made of metal or an alloy, or bonded together by an adhesive where one of them is made of a plastic material and the other is made of metal or an alloy.

A detection member (member to be detected), e.g., a permanent magnet, 50 for permitting detection of the rotation phase of the rotary filter 24 in cooperation with a rotation sensor 40 is provided on the rotor 35 of the rotary motor 30. The rotation sensor 40 for producing a rotation sync pulse P is provided at a position to confront the permanent magnet 50. The rotation sensor 40 may be mounted on the stator 33 of the motor 30.

The rest of the configuration is similar to that of FIG. 1.

The operation of the present embodiment is identical to that of FIG. 1. That is, red, green and blue images by virtue of the color image signals SR3, SG3 and SB3 are obtained through the color filter sections FR, FG and FB, each for a period one third that of the vertical period, with the result that a color image can be recognized by seeing the screen 12 of the CRT 10 through the rotary filter 24.

According to the above embodiment, the permanent magnet 50 is mounted on the rotor 35, opposite to the rotary filter 24 with respect to the stator 33, and the rotation sensor 40 is disposed at a position to confront the permanent magnet 50. As a result, the space between the motor 30 and the rotary filter 24 can be made narrow, and the size of the device can be reduced.

Embodiment 2

In the embodiment of FIG. 8, the filter assembly 22 and the motor shaft 32 of the motor 30 are formed integrally. But this may be difficult to fabricate. It has been proposed to connect the rotary filter 24 of the filter assembly 22 to the motor shaft 32, but a special jig was necessary for such connection to position the permanent magnet 50 relative to the filter sections of the rotary filter 24.

Figure 9A:
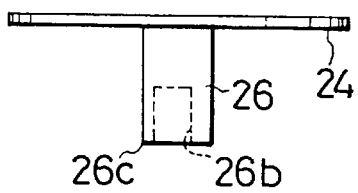
FIG. 9A and FIG. 9B are a side view and a bottom view showing a filter assembly in another embodiment of the present invention.
Figure 9B:
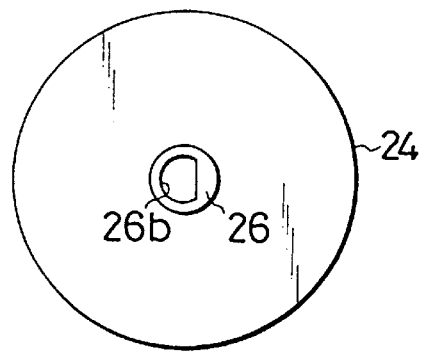
Figure 10A:
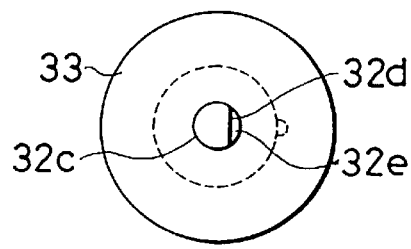
FIG. 10A and FIG. 10B are a top view and a side view of a motor with its shaft used in the embodiment of FIG. 9A and FIG. 9B.
Figure 10B:
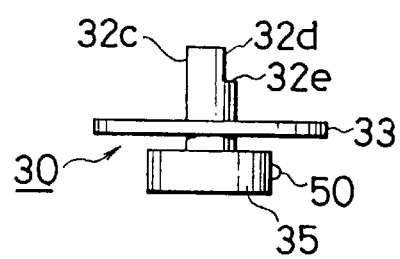
Figure 11:
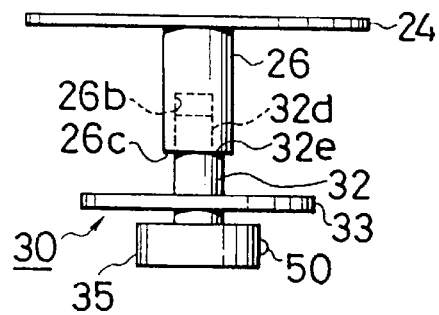
FIG. 11 is a side view showing how the filter assembly of FIG. 9A
Figure 12A:
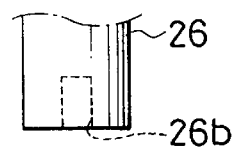
FIG. 12A and FIG. 12B are a side view and a bottom view showing a connection member in another embodiment of the present invention.
Figure 12C:
FIG. 12C and FIG. 12D are a top view and a side view of a motor shaft used in combination with the connection member of FIG. 12A and FIG. 12B.
Figure 12B:
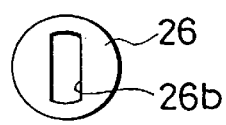
Figure 12D:
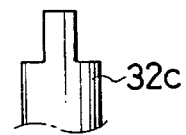
Figure 13A:
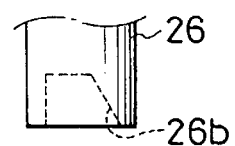
FIG. 13A and FIG. 13B are a side view and a bottom view of a connection member in another embodiment of the present invention.
Figure 13C:
FIG. 13C and FIG. 13D are a top view and a side view of a motor shaft used in combination with the connection member of FIG. 13A and FIG. 13B.
Figure 13B:
Figure 13D:
Figure 14A:
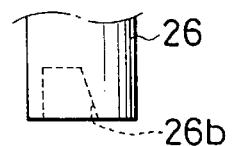
FIG. 14A and FIG. 14B are a side view and a bottom view of a connection member of a filter assembly used in another embodiment of the present invention.
Figure 14C:
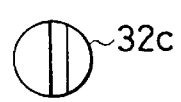
FIG. 14C and FIG. 14D are a top view and a side view of an end part of a motor shaft used in combination with the connection member of FIG. 14A and FIG. 14B.
Figure 14B:
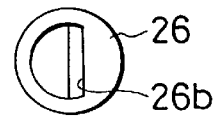
Figure 14D:
Figure 15A:
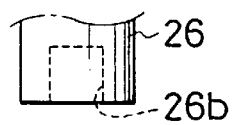
FIG. 15A and FIG. 15B are a side view and a bottom view of a connection member of a filter assembly used in another embodiment of the present invention.
Figure 15B:
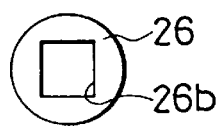
Figure 15C:
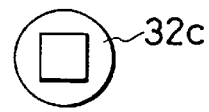
FIG. 15C and FIG. 15D are a top view and a side view of an end part of a motor shaft used in combination with the connection member of FIG. 15A and FIG. 15B.
Figure 15D:
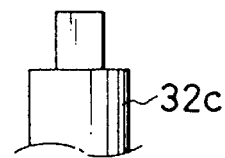
Figure 16A:
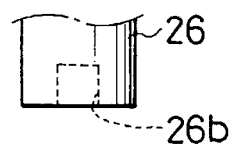
FIG. 16A and FIG. 16B are a side view and a bottom view of a connection member of a filter assembly used in another embodiment of the invention.
Figure 16B:
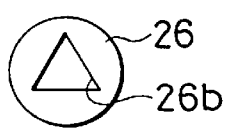
Figure 16C:
FIG. 16C and FIG. 16D are a top view and a side view of an end part of a motor shaft used in combination with the connection member of FIG. 16A and FIG. 16B.
Figure 16D:
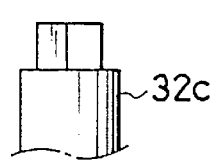

FIGS. 9A, 9B, 10A, 10B, and 11 show another embodiment of the invention. More specifically, FIGS. 9A and 9B are a side view and a bottom view of a filter assembly used in this embodiment. FIGS. 10A and 10B are a top view and a side view of a motor with its shaft used in this embodiment. FIG. 11 is a side view showing how the filter assembly of FIGS. 9A and 9B is fixed to the motor of FIGS. 10A and 10B.

It should be noted that although the terms "top view", "bottom view", and "side view" are used, they are used for illustration purpose and do not necessarily reflect the orientation in the assembled coloring device. This also applies to description of other drawings.

According to this embodiment, a cut-away portion 32d is provided at an end part 32c of the motor shaft 32, and an insertion bore 26b having a cross section conforming to the cross section of the end part 32c of the motor shaft 32 is provided on a connection member 26. The connection member 26 may be formed integrally with the rotary filter 24 to form a filter assembly 22 together. The motor shaft 32 is inserted in the insertion bore 26b of tie connection member 26 for connection. Thus, the positioning of the permanent magnet 50 at a specific position or rotational phase angle with respect to the filter sections of the rotary filter 24 can be achieved without resorting to a special jig mentioned above. The motor shaft 32 of the motor 30 and the connection member 26 can be fixed by resilient pressure (when pressure insertion is adopted) or by an adhesive.

Moreover, since connection is achieved by providing the cut-away portion 32d at the end part 32c of the motor shaft 32, and the insertion bore 26b having a cross section conforming to the cross section of the end part 32c of the motor shaft 32, deviation or shift of the rotary filter 24 in the rotational direction can be prevented.

Furthermore, the shoulder 32e at the end of the cut-away 32d provided on the motor shaft 32 and the tip of the connection member 26 are in abutment with each other, the distance between the filter sections FR, FG and FB and the screen 12 of the CIT 10 can be maintained at an appropriate value (FIG. 8).

Where the length of the cut-away 32d of the motor shaft 32 in the axial direction is longer than the depth of the insertion bore 26b of the connection member 26, the tip of the motor shaft 32 and the bottom surface of the insertion bore 26b of the connection member 26 are in abutment with each other, so that the distance between the filter sections FR, FG and FB of the rotary filter 24 and the screen 12 of the CRT 10 can be maintained at an appropriate value.

FIGS. 12A to 12D, 13A to 13D, 14A to 14D, 15A to 15D, and 16A to 16D respectively show other examples of the end part of the motor shaft 32 of the motor 30 and the insertion bore 26b provided at the connection member 26.

FIGS. 12A, 13A, 14A, 15A and 16A are side views showing the insertion bore 26b in the connection member 26. FIGS. 12B, 13B, 14B, 15B and 16B are bottom views showing the insertion bore 26b in the connection member 26. FIGS. 12C, 13C, 14C, 15C and 16C are top views showing the end part 32c of the motor shaft 32. FIGS. 12D, 13D, 14D, 15D and 16D are side views showing the end part 32c of the motor shaft 32. The structures shown in FIGS. 13A to 13D and FIGS. 14A to 14D permit the insertion of the motor shaft 32 in the insertion bore at a single rotational position. The structure shown in FIGS. 12A to 12D permits the insertion of the motor shaft 32 in the insertion bore at either of two rotational positions, the structure shown in FIGS. 16A to 16D permits the insertion of the motor shaft 32 in the insertion bore at any of three rotational positions and the structure shown in FIGS. 15A to 15D permits the insertion of the motor shaft 32 in the insertion bore at any of four rotational positions. However, by providing a mark printed or engraved on the motor shaft 32 and the connection member 26 in the structures of FIGS. 12A to 12D, FIGS. 15A to 15D and FIGS. 16A to 16D, one of the rotational positions permitted by the shape of the end part the motor shaft and the insertion bore of the connection member 26 can be selected to give the desired position.

In addition, even without resorting to the marks, the structure of FIGS. 12A to 12D can be used where the rotary filter 24 has two sets of filter sections, as will be later described with reference to FIG. 29. Similarly, the structure of FIGS. 16A to 16D can be used where the rotary filter 24 has three sets of filter sections, and the structure of FIGS. 15A to 15D can be used where the rotary filter 24 has four sets of filter sections.

Embodiment 3

In the embodiments of FIGS. 12A to 16D, the cross section of the insertion bore 26b provided on the connection member 26 conforms to the cross section of the end part 32c of the motor shaft 32.

Figure 17A:
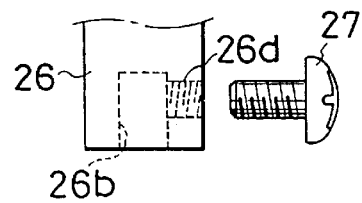
FIG. 17A is a side view of a connection member, With a screw to be threaded thereinto, of a filter assembly used in another embodiment of the present invention.
Figure 17B:
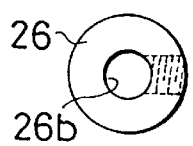
FIG. 17B is a bottom view of the connection member of FIG. 17A.

FIGS. 17A to 19 show another embodiment of the present invention. More specifically, FIGS. 17A and 17B are a side view and a bottom view of a connection member 26, with a screw 27 to be threaded thereinto, of a filter assembly used in this embodiment. FIGS. 18A and 18B are a top view and a side view of an end part 32c of a motor shaft 32 used in this embodiment. FIG. 19 is a side view showing how the connection member 28 of FIGS. 17A and 17B is fixed to the end part of the motor shaft 32 of FIGS. 18A and 18B.

In this embodiment, the insertion bore 26d is made to have a circular cross section while a tapped hole 26d is provided at a part corresponding to the cut-away 32d at the end part 32c of the motor shaft 32, and a screw 27 is threaded in the tapped hole 26d so that its tip is in abutment with the cut-away 26b for fixing.

With the above configuration, the rotational position of the permanent magnet 50 with respect to the filter sections of the rotary filter 22 can be established, and the deviation or shift of the rotary filter 22 in the rotational direction or in the axial direction can be restricted.

In place of the cut-away 32d at the end part of the motor shaft 32, the motor shaft 32 may be provided with a tapped hole (riot shown), into which the screw 27 may be threaded into the tapped hole for tightening.

Embodiment 4

Figure 20C:
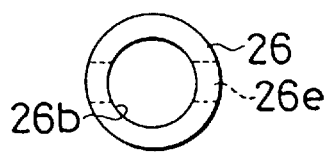
FIG. 20C is a bottom view of the connection member of FIG. 20A and FIG. 20B.
Figure 21A:
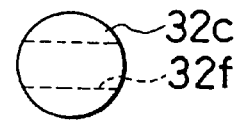
FIG. 21A is a top view of an end part of a motor shaft used in combination with the connection member of FIG. 20A, FIG. 20B and FIG. 20C.
Figure 21C:
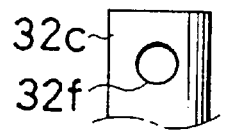
FIG. 21C is a side view, as seen from a different angle, showing the end part of the motor shaft of FIG. 21A and FIG. 21B.
Figure 21B:
FIG. 21B is a side view of the end part of the motor shaft of FIG. 21A.
Figure 22:
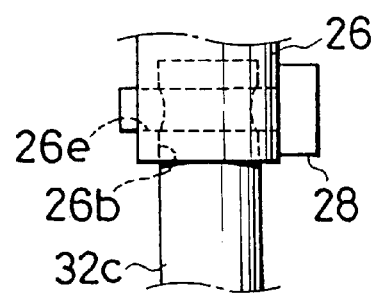
FIG. 22 is a side view showing how the connection member of FIG. 20A to FIG. 20C is fixed to the end part of the motor shaft of FIG. 21A to FIG. 21C.

FIGS. 20A to 22 show another embodiment of the present invention. More specifically, FIGS. 20A to 20C are side views and a bottom view of a connection member 26 of a filter assembly used in this embodiment, with a pin 28 to be inserted in the connection member 26. FIGS. 21A to 21C are a top view and side views of an end part 32c of a motor shaft 32 used this embodiment. FIG. 22 is a side view showing how the connection member 26 of FIGS. 20A to 20C is fixed to the end part 32c the motor shaft 32 of FIGS. 21A to 21C.

In this embodiment, pin insertion holes 26c and 32f are provided in the connection member 26 and the end part 32c of the motor shaft 32, and a pin 28 (in place of the screw 27 used in the embodiment of FIGS. 17A to 19) having a pin head 28a and a stem part 28b having a circular cross section is inserted in the pin insertion holes 26e and 32f.

The pin insertion holes 26e and 32f need not be through-holes. The stem part 28b of the pin 28 need not have a circular cross section, arid the pin 28 need not have the pin head 17a.

Embodiment 5

Figure 23A:
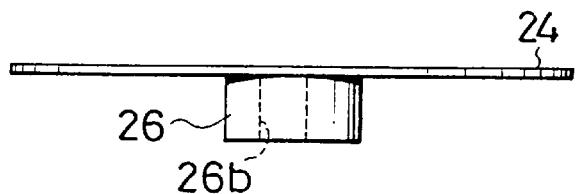
FIG. 23A is a side view of a filter assembly used in another embodiment of the present invention.
Figure 24A:
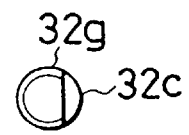
FIG. 24A is a top view of an end part of a motor shaft used in combination with the filter assembly of FIG. 23A and FIG. 23B.
Figure 23B:
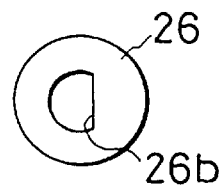
FIG. 23B is a bottom view of only the connection member of the filter assembly of FIG. 23A.
Figure 24B:
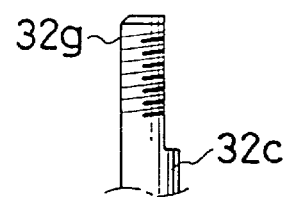
FIG. 24B is a side view of the end part of the motor shaft of FIG. 24A.
Figure 25:
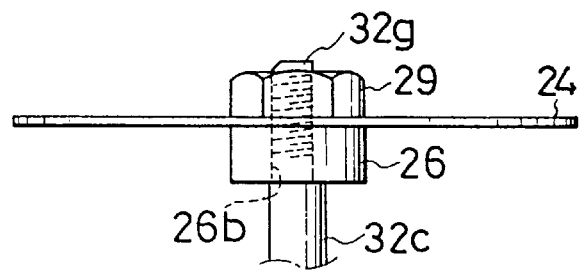
FIG. 25 is a side view showing how the filter assembly of FIG. 23A

FIGS. 23A to 25 show another embodiment of the present invention. More specifically, FIGS. 23A and 23B are a side view and a bottom view of a filter assembly used in this embodiment. FIGS. 24A and 24B are a top view and a side view showing an end part 32c of a motor shaft 32 used in this embodiment. FIG. 25 is a side view shoving how the filter assembly of FIGS. 23A and 23B is fixed to the end part 32 of the motor shaft 32 of FIGS. 24A and 243.

In this embodiment, the end part of the motor shaft 32 has a threaded part 32g, and a nut 29 is used for fixing after the motor shaft 32 is inserted in the insertion bore 26b of the connection member 26. It is not necessary to insert a screw or pin from the side as in the embodiments of FIGS. 17 to 19 and FIGS. 2A to 22, and even when the rotary filter 24 is large in diameter, the fixing can be accomplished with ease.

Embodiment 6

Figure 26A:
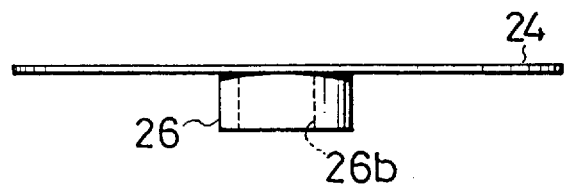
FIG. 26A is a side view of a filter assembly used in another embodiment of the present invention.
Figure 26B:
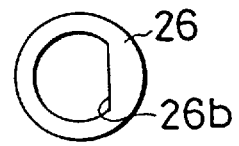
FIG. 26B is a bottom view of only the connection member of the present filter assembly of FIG. 23A.
Figure 27A:
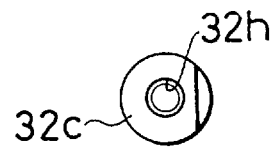
FIG. 27A is a top view of an end part of a motor shaft used in combination with the filter assembly of FIG. 26A and FIG. 26B.
Figure 27B:
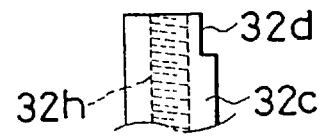
FIG. 27B is a side view of the end part of the motor shaft of FIG. 27A.
Figure 28:
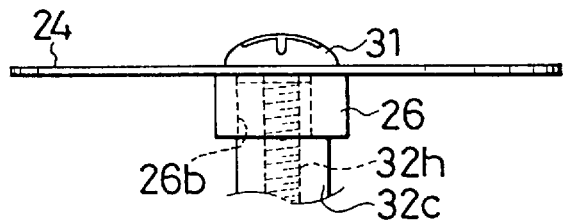
FIG. 28 is a side view of how the filter assembly of FIG. 26A

FIGS. 26A to 28 show another embodiment of the present invention. More specifically, FIGS. 26A and 26B are a side view and a bottom view of a filter assembly used in this embodiment. FIGS. 27A and 27B are a top view and a side view of an end part of a motor shaft used in this embodiment. FIG. 28 is a side view showing how the filter assembly of FIGS. 26A and 26B is fixed to the end part 32c of the motor shaft 32 of FIGS. 27A and 27B.

In this embodiment, the motor shaft 32 is provided with a tapped hole 32h extending in the axial direction, and a screw 31 is inserted through the rotary filter 24 and the connection member 26 after the motor shaft 32 is inserted in the insertion bore 26b of the connection member 26.

Embodiment 7

The features of the above embodiments may be combined with each other. Since the configurations of Embodiment 2 to Embodiment 6 are such as to prevent deviation or shift of the rotary filter 24 in the rotary and axial directions, they can be equally applied to the arrangement (FIG. 1) in which the permanent magnet 50 is provided on the rotary filter 24.

The motor used in the above embodiments comprises disk-shaped rotor and a disk-shaped stator. In substitution, other types of motors may be used.

As has been described, according Embodiment 1 to Embodiment 7 described above, the detection member, such as the permanent magnet, is disposed on the rotor of the motor, and a rotation sensor is disposed to confront the detection member mounted on the rotor of the motor. As a result, the space between the main body 34 (stator 33 and rotor 35) of the motor and the rotary filter 24 need not be wide, and the size of the color image display can be reduced.

To position the detection member at a specific rotational position relative to the filter sections of the coloring member, the motor shaft 32 and the rotary filter 24 may be formed integrally. They may be formed separately and connected to establish the required positional relationship. The latter arrangement is advantageous with respect to the ease and cost of fabrication.

Embodiment 8

Figure 29:
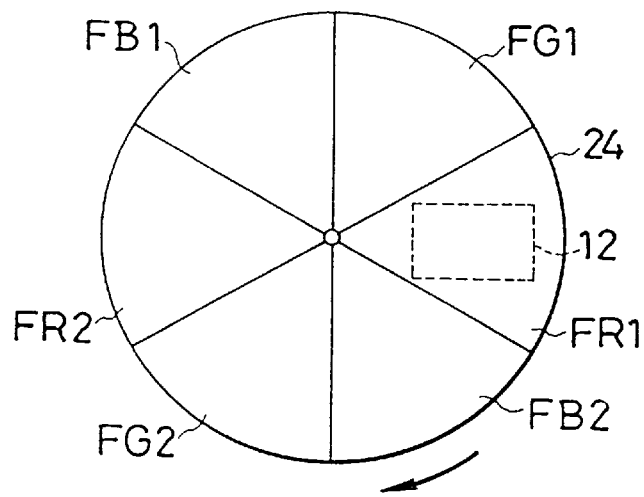
FIG. 29 illustrates a conical rotary filter of another embodiment of the present invention.

FIG. 29 shows a rotary filter 24 of another embodiment of the present invention. This rotary filter 24 may be used in place of the rotary filter 24 in FIG. 1 or in FIG. 8 to form a color image display device.

As illustrated, the rotary filter 24 in this embodiment includes two sets of filter sections FR1, FG1 and FB1, and FR2, FG2 and FB2 of the three colors of red, green and blue. The rest of the configuration may be identical to the prior art of FIGS. 1 to 5 or any of the embodiments of FIGS. 8 to 28.

The operation will next be described. The color image signals output from the memories 66R, 66G and 66B are sequentially selected by the multiplexer 64 in accordance with the vertical sync signal, so that the rotary filter 24 must be rotated in step therewith. However, since two sets of filter sections, as opposed to one set in the prior art, are provided, the rotational speed is reduced to one half, and the driving voltage can be reduced, and the power consumption can be reduced.

Instead of two sets, more sets of color filters may be provided. If N sets of filter sections are provided, the rotational speed is reduced to V/N (V being the frequency of the vertical sync signal) revolutions per second.

As has been described, according to the above embodiment, the rotary filter 24 includes a plurality of sets of filter sections, so the rotational speed can be reduced, and the driving voltage of the motor can be reduced and the power consumption can be reduced.

Embodiment 9

Figure 30:
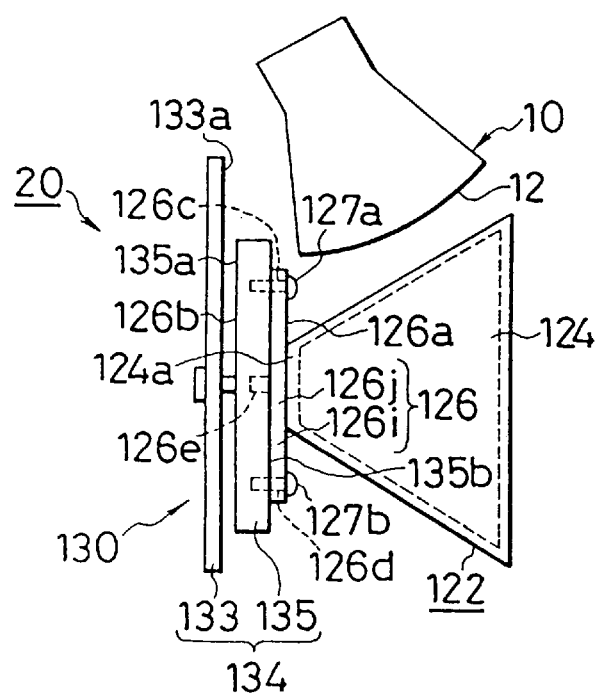
FIG. 30 a coloring device of another embodiment of the present invention.
Figure 31:
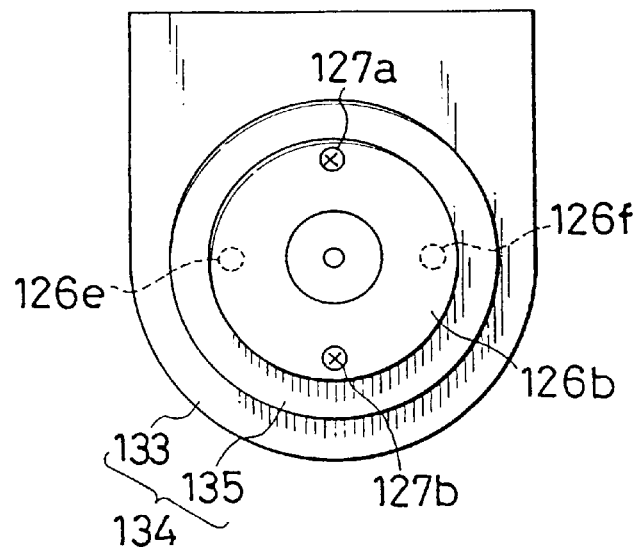
FIG. 31 is a front view, with the conical rotary filter removed, showing the mounting of the connection member to the rotor of the motor.
Figure 32:
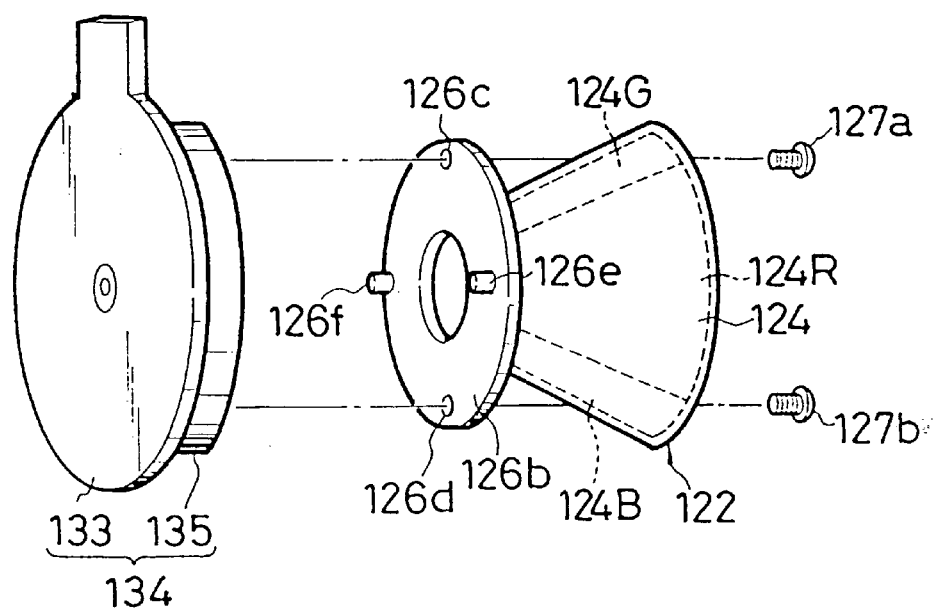
FIG. 32 is an exploded view of the coloring device of FIG. 30 and FIG. 31.

FIGS. 30 to 32 show a coloring device 20 of another embodiment of the invention. FIG. 31 is a front view, with a rotary filter 124 removed, to illustrate the mounting of a connection member 126 to a motor 130. FIG. 32 is an exploded view showing how the coloring device 20 is assembled.

Figure 6:
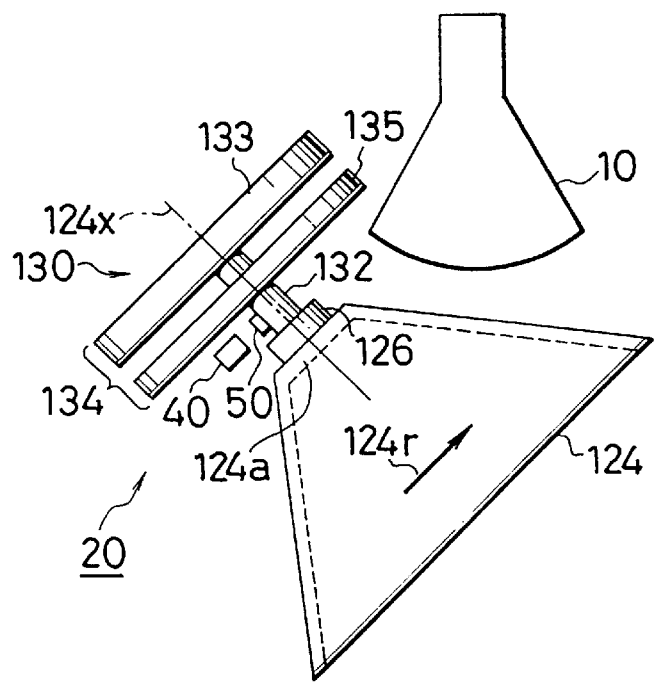
FIG. 6 illustrates another example of coloring device for a color image in the prior art.
Figure 7:
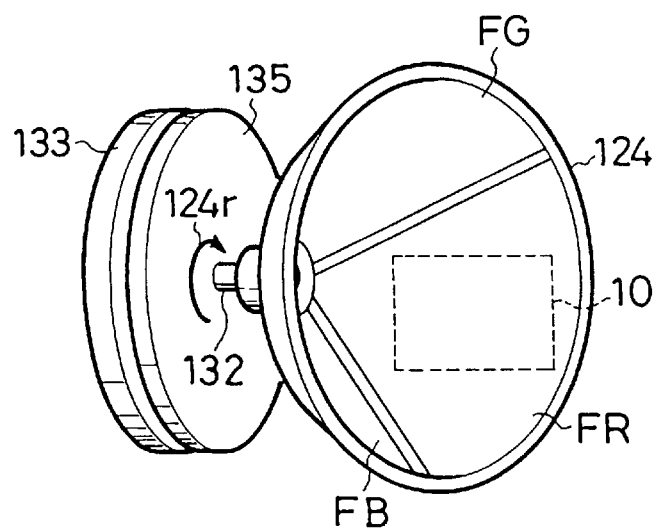
FIG. 7 is a perspective view of the device of FIG. 6.

Like the conventional device of FIGS. 6 and 7, a coloring device 20 of this embodiment includes a filter assembly 122 having a rotary filter 124 in the form of a truncated circular cone which is rotatable about the axis of the cone and is equally divided by generators (straight lines extending along the surface of the cone and passing through the vertex of the cone) of the cone into red, green and blue filter sections 124R, 124G and 124B, and a generally flat connection member 126 which includes a flange part 126i extending radially outward from the smaller-diameter end 124a of the conical rotary filter 24 and a disk-shaped part 124j positioned inside the smaller-diameter end 124a of the conical rotary filter 24. In the illustrated embodiment, the flange part 126i and the disk-shaped part 126j are formed integrally, i.e., they together form a one piece body. The connection member 126 has a first surface 126a, to which the smaller-diameter end 124a of the conical rotary filter 124 is connected. The connection member 126 has a second surface 126b in contact with a second surface 135b of the disk-shaped rotor 135. Provided in the flange part 126i of the connection member 126 are a pair of mounting holes 126c and 126d, and a pair of positioning protrusions 126e and 126f.

The motor 130 of this embodiment comprises a disk-shaped stator 133 and a disk-shaped rotor 135 having first surfaces 133a and 135a adjacent to and confronting each other, like that of the embodiment of FIG. 8. But the rotor 135 of this motor and the rotary filter 124 are not on the opposite sides of the stator 133, but the rotary filter 124 is mounted to the rotor 135 by means of the connection member 126. In other words, the filter assembly 122 including the rotary filter 124 and the connection member 126 is directly mounted to the rotor 135 of the motor 130.

For such mounting, the rotor 135 is provided with a pair of tapped holes corresponding to the pair of the mounting holes 126c and 126d of the connection member 126, and a pair of dents corresponding to the pair of positioning protrusions 126e and 126f of the connection member 126 are inserted in the pair of dents of the rotor 135 of the motor 130, so that the filter sections of the rotary filter 124 are positioned relative to the motor 130. In this state, screws 127a and 127b are inserted through the mounting holes 126c and 126d of the connect ion member 126 and screwed into the rotor 135. In this way, the connection member 126 which is fixed to the smaller-diameter end 124a of the conical rotary filter 124 is directly mounted to the rotor 135 of the motor 130, with one surface 126b of the connection member 126 being in contact with a second surface 135b of the disk-shaped rotor 135.

The coloring device 120 of the above configuration can be used to form a color image display device, by disposing a CRT 10 in a manner shown in FIG. 30 and connecting it with other circuit components in a manner shown in FIG. 8.

Embodiment 10

Figure 33:
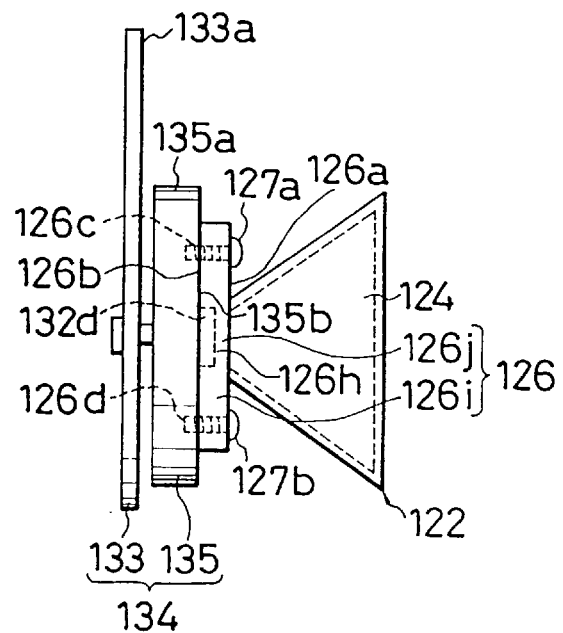
FIG. 33 is a side view of a coloring device of another embodiment of the present invention.
Figure 34:
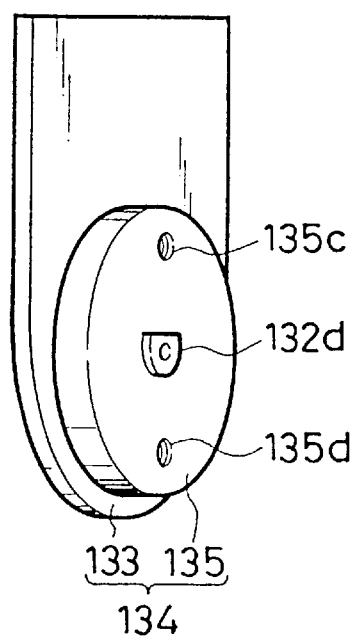
FIG. 34 is a perspective view of the rotor and the stator of the motor for use in the embodiment of FIG. 33.

FIGS. 33 and 34 show a coloring device 20 of another embodiment of the present invention. FIG. 33 is a side view. FIG. 34 is a perspective view of the motor. The rotary filter 124 is identical to that of Embodiment 9. The connection member 126 and the rotor 135 of the motor 130 arc similar to those of Embodiment 9. But, the connection member 126 of this embodiment does not have the positioning protrusions 126e and 126f arid the rotor 135 of the motor 130 does not have the dents corresponding to the positioning protrusions 126e and 126f. instead, a bush 132d in the form of a partially-cut-off disk is provided at the center of the rotor 135 of the motor 130, while a dent 126h is provided in the center of the connection member 126 to engage with the bush 132d.

The rotary filter 124 is positioned relative to the rotor of the motor 130 by inserting the bush 132d in the dent 126h, and the screws 127a and 127b are inserted through the mounting holes 126c and 126d, into the corresponding tapped holes 135c and 135d in the rotor 135, and tightened to fix the connection member 126 to the rotor 135. In this way, the filter assembly 122 including the rotary filter 124 and the connection member 126 is directly mounted to the rotor 135 of the motor 130.

Embodiment 11

Figure 35:
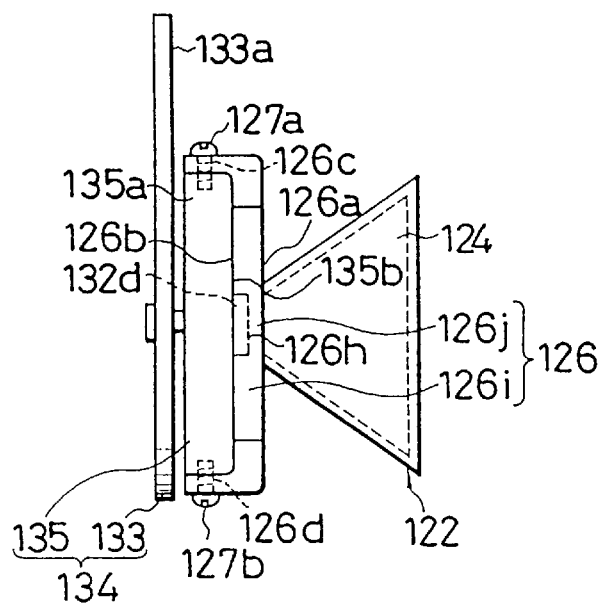
FIG. 35 is a side view of a coloring device of another embodiment of the present invention.
Figure 36:
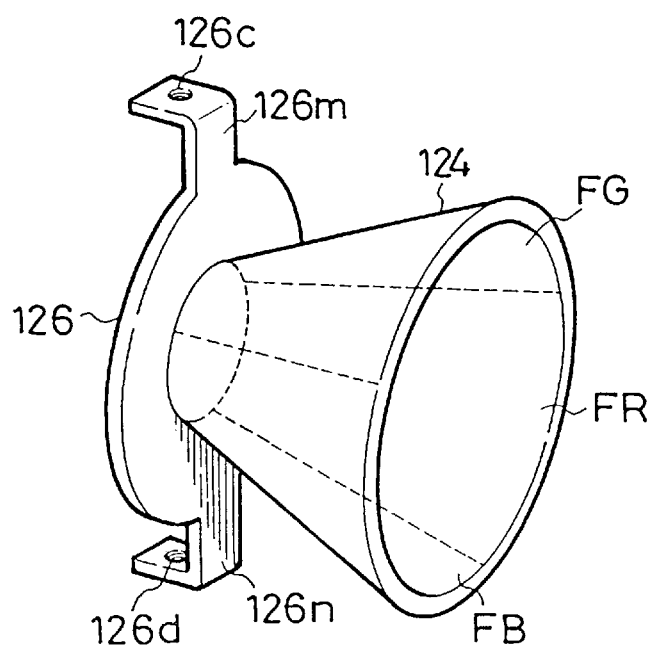
FIG. 36 is a perspective view of the filter assembly of the embodiment of FIG. 35.

In Embodiment 10, the connecting member 126 has a flange part 126*i* having mounting holes 126*c* and 126*d* to permit insertion of screws which are threaded into the rotor. FIGS. 35 and 36 show an alternative configuration. As illustrated, the connection member 126 has extensions 126*m* and 126*n*, which are bent to run along the outer peripheral surface of the rotor and is provided with mounting holes 126*c* and 126*d*, and tapped holes are provided in the rotor at positions corresponding to the mounting holes 126*c* and 126*d* of the extensions 126*m* and 126*n*. For mounting, screws 127*a* and 127*b* are inserted through the mounting holes 126*c* and 126*d* and threaded into the corresponding tapped holes in the rotor, and tightened for fixing the connection member 126 to the rotor 135. In this way, the filter assembly 122 is directly fixed to the rotor 135. The rest of the configuration is identical to that of Embodiment 9. A similar modification can be applied to Embodiment 9.

The concept disclosed above with reference to the embodiments of FIGS. 30 to 36 is also applicable to a disk-shaped rotary filter 24. That is, in place of the filter assembly 122 having a conical rotary filter 124, the filter assembly 22 having a disk-shaped rotary filter 24 like the one shown in FIG. 1 or in FIG. 8, may be directly mounted to the rotor.

As has been described, according to the above embodiments of FIGS. 30 to 36, the filter assembly including the rotary filter and the connection member is mounted directly to the rotor of the motor, so the size of the device can be reduced, and the accuracy of the positioning of the filter assembly relative to the motor is improved.

Embodiment 12

Figure 37:
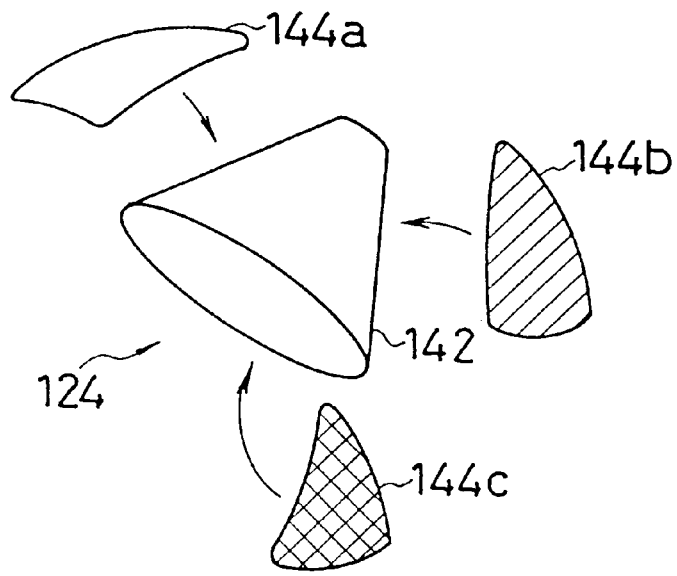
FIG. 37 illustrates a conical rotary filter of another embodiment of the invention.

FIG. 37 shows a rotary filter 124 of another embodiment of the invention. As illustrated, the present rotary filter 124 of this embodiment is in the form of a truncated circular cone formed of a transparent base 142 which is equally divided by generators of the cone, into three parts, which are respectively provided with red, green and blue color filter sheets 144*a*, 144*b* and 144*c* having a transparency only to the light component of the respective color, and attached to the conical surface by transparent adhesive tape, a transparent adhesive material, or like. The rotary filter 124 is rotated about the axis of the cone, and it can be used in place of the rotary filter 124 of FIGS. 6 and 7 or FIGS. 30 to 36.

Embodiment 13

Figure 38:
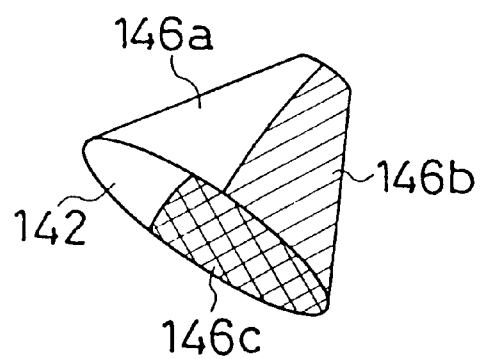
FIG. 38 illustrates a conical rotary filter of another embodiment of the invention.

FIG. 38 is a perspective view of a rotary filter 124 of another embodiment of the present invention. In place of the filter sheets used in the embodiment of FIG. 38, the filter sections 146*a*, 146*b* and 146*c* of this embodiment are respectively printed in red, green and blue to exhibit transparency only to the light component of the respective color. In other words, they are provided with red, green and blue coatings having a transparency only to the light component of the respective color. The advantages similar to those of the embodiment of FIG. 37 can be attained.

As has been described, according to the above embodiments, it is not necessary to use a filter material which has a conical surface, which itself is rigid or self-supporting, and also has a filter characteristic. As a result, the rotary filter 124 is easy to fabricate and is less costly.

The coloring devices of the embodiments described above can be used to form a color image display system in combination with a monochromatic image display device, or a color image pick-up system in combination with a monochromatic image sensor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A coloring device comprising:

a filter assembly including color filter sections of at least three colors; and a driving unit for rotating said filter assembly such that said color filter sections pass a predetermined position as said filter assembly is rotated;

wherein said driving unit includes a rotary motor further including a stator and a rotor for rotating said filter assembly; and said filter assembly is directly mounted to said rotor of said motor and wherein neither said filter assembly nor said rotor of said motor includes an output shaft.

2. The color device according to claim 1, wherein said filter assembly further includes a rotary filter having said color filter sections, and a connection member fixed to said rotary filter and fixed to said rotor of said motor.

3. The coloring device according to claim 2, wherein said rotary filter has a truncated cone shape with a smaller-diameter end; and said connection member is fixed to the smaller-diameter end.

4. The coloring device according to claim 3, wherein said stator and said rotor have a disk-shape and stator and said rotor have first surfaces confronting each other; and said connection member fixes said rotary filter to said rotor.

5. The coloring device according to claim 4, wherein said connection member has a first surface to which the smaller-diameter end of said rotary filter is connected and a second surface in contact with a second surface of said disk-shaped rotor.

6. A color image display system comprising:

a monochromatic image display device including a screen for displaying images;

a filter assembly including color filter sections of at least three colors;

a rotary driving unit for rotating said filter assembly such that said color filter sections pass over said screen as said filter assembly is rotated; and a signal supplying device for supplying said monochromatic display device with color image signals of the at least three colors in a predefined sequence;

wherein said rotary driving unit including a rotary motor further including a stator and a rotor for rotating said filter assembly;

wherein said filter assembly is directly mounted to said rotor of said motor and wherein neither said filter assembly nor said rotor of said motor includes an output shaft.

7. The color image display system according to claim 6, wherein said filter assembly further includes a rotary filter having said color filter sections, and a connection member fixed to said rotary filter and fixed to said rotor of said motor.

8. The color image display system according to claim 7, wherein said rotary filter has a truncated cone shape with a smaller-diameter end; and said connection member is fixed to the smaller-diameter end.

9. The color image display system according to claim 8, wherein said stator and said rotor have a disk-shape and said stator and said rotor have first surfaces confronting each other; and said connection member fixes said rotary filter to said rotor.

10. The color image display system according to claim 9, wherein said connection member has a first surface to which the smaller-diameter end of said rotary filter is connected and a second surface in contact with a second surface of said disk-shaped rotor.

11. A rotary filter of a coloring device comprising:

color filter sections of at least three colors;

wherein said rotary filter has a truncated cone shape; and each of said color filter sections is formed of a transparent base provided with one of a filter sheet attached to each of said color filter sections and a coating having a transparency only to light of one of the at least three colors.

* * * * *